(12) United States Patent
Kawada et al.

(10) Patent No.: US 9,326,392 B2
(45) Date of Patent: Apr. 26, 2016

(54) DISPLAY DEVICE

(71) Applicant: Panasonic Corporation, Kadoma-shi, Osaka (JP)

(72) Inventors: Yoshihiro Kawada, Osaka (JP); Kenichi Shindo, Osaka (JP); Ryo Yonezawa, Kyoto (JP); Yoshinari Matsuyama, Osaka (JP); Hirofumi Sasaki, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 346 days.

(21) Appl. No.: 13/771,416

(22) Filed: Feb. 20, 2013

(65) Prior Publication Data

US 2014/0071649 A1 Mar. 13, 2014

(30) Foreign Application Priority Data

Sep. 7, 2012 (JP) .................................. 2012-197100

(51) Int. Cl.
*H05K 5/00* (2006.01)
*G06F 1/16* (2006.01)

(52) U.S. Cl.
CPC ............ *H05K 5/0017* (2013.01); *G06F 1/1616* (2013.01); *G06F 1/1656* (2013.01)

(58) Field of Classification Search
USPC .................................... 361/753, 752; 439/676
See application file for complete search history.

(56) References Cited

U.S. PATENT DOCUMENTS

2008/0182458 A1* 7/2008 Tracy et al. ................... 439/676

FOREIGN PATENT DOCUMENTS

| JP | 2010-217295 A | 9/2010 |
| JP | 2010-217770 | 9/2010 |
| JP | 2011-75605 A | 4/2011 |

OTHER PUBLICATIONS

Office Action issued in corresponding Japanese Patent Application on Oct. 27, 2015 (5 pages).

* cited by examiner

*Primary Examiner* — Andargie M Aychillhum
(74) *Attorney, Agent, or Firm* — Hamre, Schumann, Mueller & Larson, P.C.

(57) ABSTRACT

There is provided a display device comprising: a plate-type display section with a display surface; a front-surface plate placed on a front surface of the display surface; and a supporting portion for supporting the display section and the front-surface plate. The supporting portion includes a first surface adapted to support the front-surface plate, and a second surface which is formed in such a way as to rise up substantially vertically from the first surface such that the second surface faces a side surface of the display portion and, further, includes at least a rising base end portion thereof.

9 Claims, 5 Drawing Sheets

DISPLAY DEVICE

BACKGROUND OF THE INVENTION

1. Field of the Invention

The present disclosure relates to a display device including a plate-type display section with a display surface, which is a display device for use in an electronic apparatus and the like, for example.

2. Description of the Related Art

Conventionally, as display devices including plate-type display sections such as liquid-crystal type display sections, there have been known display devices including a display surface and an optically-transparent cover member for protecting the display surface; wherein the display surface and the cover member are stuck to each other, and the cover member is stuck to a chassis of the display device, so that the cover member and the display section are secured with respect to the chassis (refer to Japanese Patent Laid-open Publication No. 2010-217770, for example).

SUMMARY OF THE INVENTION

Electronic apparatuses frequently employing display devices as described above have been increasingly required, particularly in recent years, to have reduced sizes and reduced weights. Along therewith, attempts have been made to reduce the thicknesses and the weights of their chassis and, furthermore, various studies have been made for efficient utilization of the internal spaces therein. As such chassis are increasingly reduced in thickness and weight, there is a growing trend toward an increase in the difficulty in ensuring sufficient securing-and-holding functions for securing and holding the plate-type display sections with respect to the chassis, when impulsive loads and the like are exerted on the display devices.

Particularly, when the display section is displaced in a direction substantially parallel with its surface attached to the supporting portion of the chassis (in a lateral direction of the display section), due to an impulsive load exerted on the display device, if the receiving surface of the supporting portion which faces the side surface of the display section is easily deformed, this induces a greater amount of displacement of the display section, which disadvantageously exerts significant adverse influences on the components inside the display section. Further, particularly, in cases where an attempt is made to provide a necessary space (a space portion) in the opposite side from the receiving surface of the supporting portion, the supporting portion is made to have a reduced thickness at its portion having the receiving surface, which degrades the rigidity of this portion, thereby making the aforementioned adverse influences more prominent.

To cope therewith, One non-limiting and exemplary embodiment provides a display device capable of effectively suppressing the displacement of a display section in lateral directions, with a relatively-simple structure.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one general aspect of the present disclosure, there is provided a display device includes a plate-type display section with a display surface; a front-surface plate placed on a front surface of the display surface; and a supporting portion for supporting the display section and the front-surface plate. And, the supporting portion includes a first surface adapted to support the front-surface plate, and a second surface which is formed in such a way as to rise up substantially vertically from the first surface such that the second surface faces a side surface of the display portion and, further, includes at least a rising base end portion thereof.

In the display device according to the present disclosure, the supporting portion for supporting the display section and the front-surface plate includes the first surface adapted to support the front-surface plate, and the second surface which faces the side surface of the display portion. The second surface is formed in such a way as to rise up substantially vertically from the first surface and, further, the second surface includes at least the rising base end portion thereof. Accordingly, when the display section is going to move laterally, such as when an impulsive load is exerted on the display device, the side surface of the display section can be received by the second surface, at its rising base end portion with higher rigidity or at the vicinity thereof. This can suppress the lateral displacement of the display section more effectively. This also results in alleviation of adverse influences exerted on the internal components in the display section.

DETAILED DESCRIPTIONS

Figure 1:
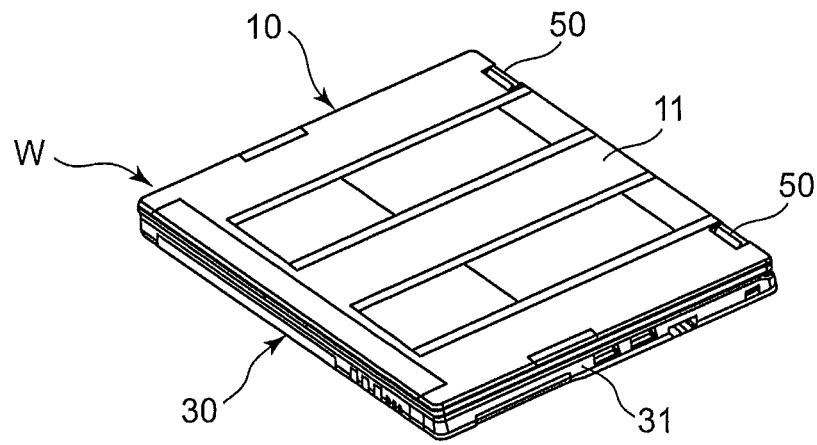
FIG. 1 is a perspective view illustrating a laptop PC in an unused state (a closed state), according to an embodiment of the present disclosure.

The display device according to the present disclosure can be provided to have the aforementioned basic structure, in aspects as follows. Specifically, in the display device having the aforementioned structure, a cushioning element may be interposed between the side surface of the display section and the second surface of the supporting portion.

With this structure, when the display section is going to move laterally, such as when an impulsive load is exerted on the display device, it is possible to effectively alleviate, through the cushioning element, the impulsive effect transmitted from the side surface of the display section to the second surface of the supporting portion.

Further, in the aforementioned cases, the supporting portion may be formed to include a first supporting portion having the first surface and a second supporting portion having the second surface, such that the first supporting portion and the second supporting portion form a substantially-L- shaped vertical cross section, and a space is formed in the opposite side from the first and second surfaces.

With this structure, since the space is provided in the opposite side from the first and second surfaces of the supporting portion, it is possible to efficiently utilize the internal space in the display device. In this case, even when the second supporting portion having the second surface for receiving the side surface of the display section is made to have a reduced thickness, the side surface of the display section is received by the second surface at the rising base end portion with higher rigidity or at the vicinity thereof, which can largely alleviate the influence of the reduction of the rigidity of the second supporting portion due to the thickness reduction.

Further, in this case, a predetermined component may be housed in the space.

With this structure, the space formed in the opposite side from the first and second surfaces of the supporting portion can be caused to house, therein, predetermined components in the display device, which enables efficient utilization of the internal space in the display device.

Embodiments

Hereinafter, an embodiment will be described in detail, with reference to the drawings, appropriately. However, descriptions in detail more than necessary may be omitted. For example, matters which have been already well known may not be described in detail, and substantially the same structures may not be described redundantly. This is for avoiding the following descriptions from being unnecessarily redundant, and for allowing those skilled in the art to easily understand them.

It is to be noted that the present inventor (s) gives the accompanying drawings and the following descriptions for allowing those skilled in the art to sufficiently understand the present disclosure, and the main theme defined in the claims is not intended to be restricted thereby.

Further, in the following description, terms which denote certain directions (such as "upper", "lower", "left", "right" and other terms including these terms, "clockwise", "counterclockwise") may be used, but the use of them is merely for ease of understanding of the disclosure with reference to the drawings, and the present disclosure should not be restrictively understood by the meanings of these terms.

The embodiment of the present disclosure which will be described later is an example where the present disclosure is applied to a display device of a so-called laptop personal computer (hereinafter, appropriately abbreviated as a "laptop PC").

Figure 2:
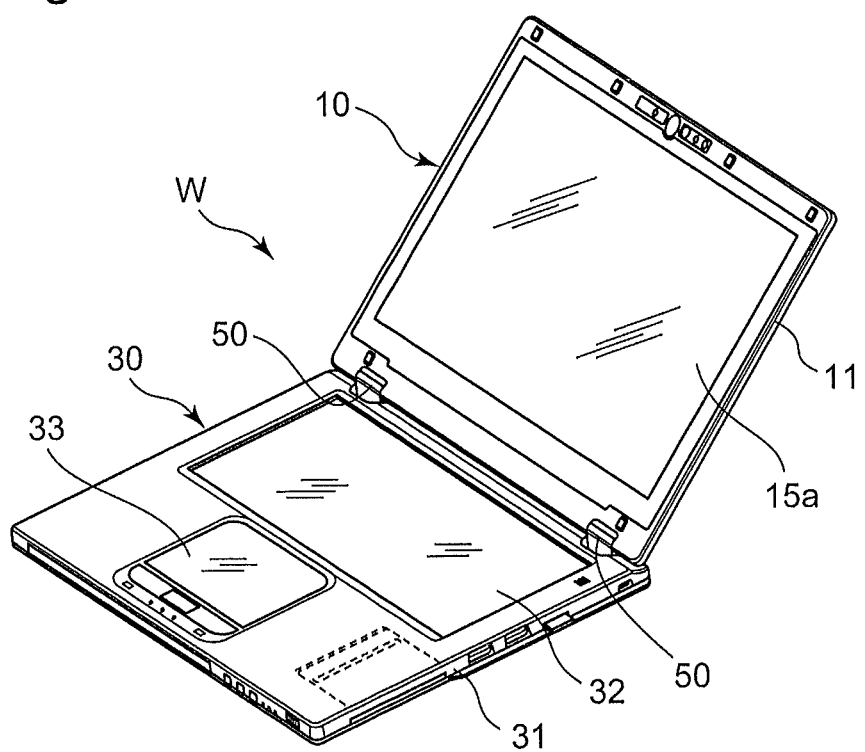
FIG. 2 is a perspective view illustrating the laptop PC in a state where it can be used (an opened state)

FIG. 1 and FIG. 2 are perspective views illustrating a laptop PC as an electronic apparatus according to the present embodiment, in an unused state (a closed state) and in a state where it can be used (an opened state), respectively.

As illustrated in these figures, a laptop PC W according to the present embodiment includes a display unit 10 having a display screen 15a of a liquid crystal type, for example, and, further, includes an operation control unit 30 capable of creating display signals to be inputted to the display unit 10.

The operation control unit 30 includes an input device 32 such as a touch-panel type keyboard employing, for example, a liquid crystal and, further, includes signal processing circuits for creating display signals to be outputted to the display unit 10 based on inputting operations and the like having been performed through the input device 32, a central processing unit (so-called CPU), peripheral components therefor (which are not illustrated), and the like. Further, in an operation state where a user (a person who uses the laptop PC) operates the laptop PC W, a touch pad 33 is provided in front of the input device 32 when viewed from the user, which enables the user to perform moving of a cursor, scrolling of the display screen 15a, and the like, only by stroking the touch pad 33 upwardly, downwardly, leftwardly and rightwardly.

The display unit 10 includes a display-unit-side chassis 11 (a first chassis) which covers the peripheral edges and the back surface of the display unit 10. Also, the operation control unit 30 includes an operation-control-unit-side chassis 31 (a second chassis) which covers the peripheral edges and the back surface of the operation control unit 30. Further, the main parts of the first chassis 11 and the second chassis 31 are made of a metal material, such as magnesium (Mg), in order to ensure that they have required mechanical strengths and rigidity and the like. Further, both the chassis 11 and 31 are openably coupled to each other through a hinge mechanism 50.

More specifically, the first chassis 11 and the second chassis 31 are both formed to have substantially rectangular basic shapes in their entirety in a plan view, and they are coupled to each other through the hinge mechanism 50 at their rear sides when viewed from the user of the laptop PC W in a closed state, which enables operations for opening and closing both the chassis 11 and 31 with respect to each other through the hinge mechanism 50. Further, in the present specification, the aforementioned term "rectangular" may also include "square", in one aspect.

Through this opening/closing mechanism, the laptop PC W can be selectively changed over in terms of its opening/closing state, between an unused state where the display unit 10 and the operation control unit 30 are closed to join together (a closed state: FIG. 1) and an usable state where the display unit 10 is risen up with respect to the operation control unit 30 at an arbitrary angle (an opened state: FIG. 2).

Further, the hinge mechanism 50 and the like can be structured, in such a way as to realize, for example, an opened state where the display unit 10 is flatly laid after having been rotated by 180 degrees, as well as an opened state where the display unit 10 is risen up after having been rotated by an arbitrary angle smaller than 180 degrees, as illustrated in FIG. 2, as "an usable state" of the laptop PC W. Further, the hinge mechanism 50 and the like can be structured, in such a way as to realize, for example, an opened state where the first chassis 11 and the second chassis 31 are in contact with each other at their back surfaces after the display unit 10 has been rotated by about 360 degrees. In this case, it can be also structured such that the display screen can be reversed to face upwardly in an opened state at 360 degrees.

Next, the structure of the display unit 10 and the like will be described, with reference to FIGS. 3 to 11.

Figure 3:
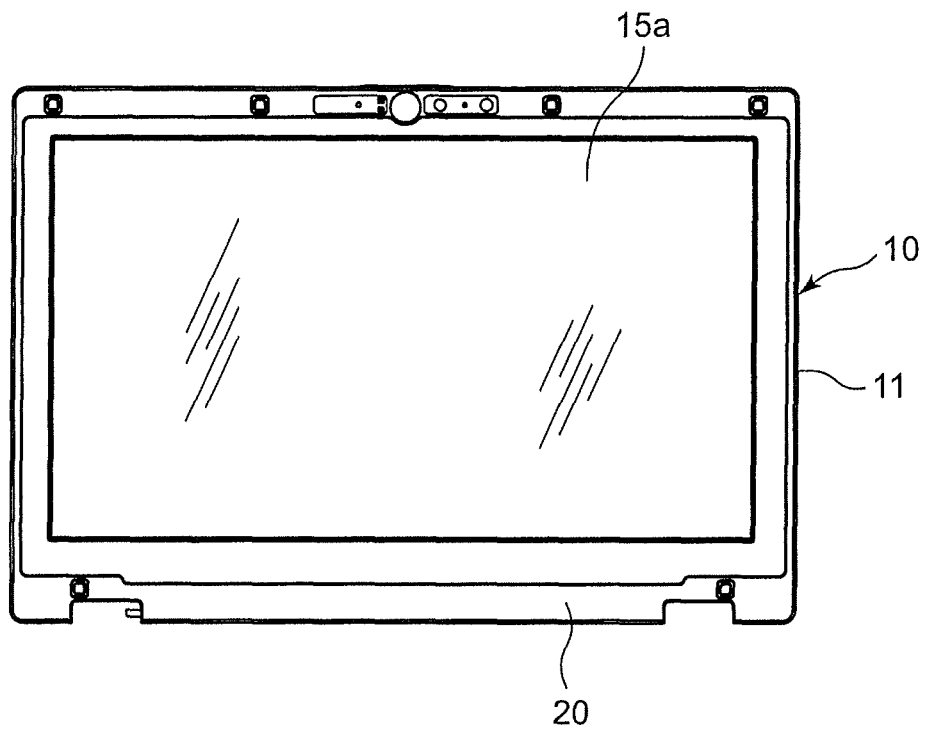
FIG. 3 is a front view of a display unit in the laptop PC.
Figure 4:
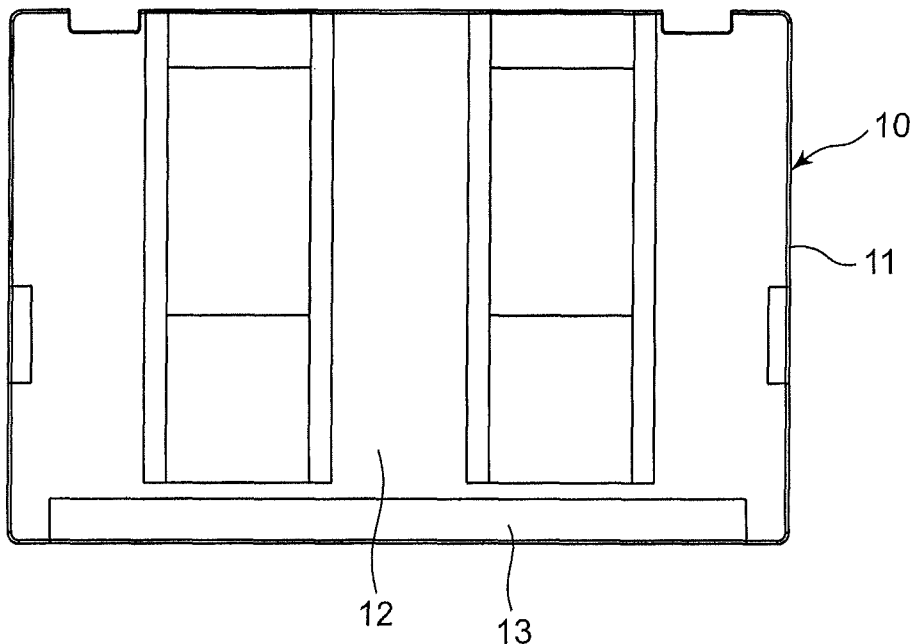
FIG. 4 is a rear view of the display unit.
Figure 5:
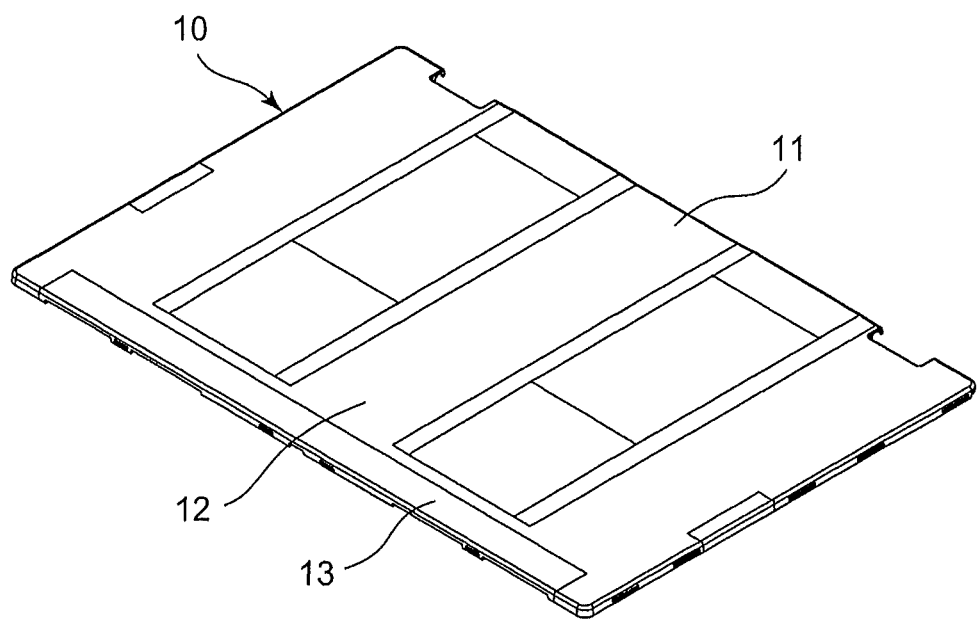
FIG. 5 is a perspective view illustrating the display unit seen from its back side and obliquely above.

FIGS. 3, 4 and 5 are a front view and a rear view of the display unit 10, and a perspective view illustrating the same seen from its back side and obliquely above. As illustrated in these figures, the first chassis 11 includes a back panel 12 having a rectangular shape in a front view, and an upper cover 13 placed on the back panel 12. And, the upper cover 13 is integrally coupled to the back panel 12 to form the outer plates (the outer panels) of the first chassis 11.

Inside the outer panels 12 and 13 in the first chassis 11, a base frame 20 having a rectangular frame shape in a front view is placed opposite to the back panel 12. In this case, the back panel 12 is made of a metal such as Mg as described above. The upper cover 13 and the base frame 20 are both made of plastics, for example. The liquid crystal panel 15 having the display screen 15a on its surface is covered, at its back surface, with the back panel 12 and the upper cover 13, in a state where the liquid crystal panel 15 is placed within the frame of the base frame 20, so that the liquid crystal panel 15 is housed within the first chassis 11.

Figure 6:
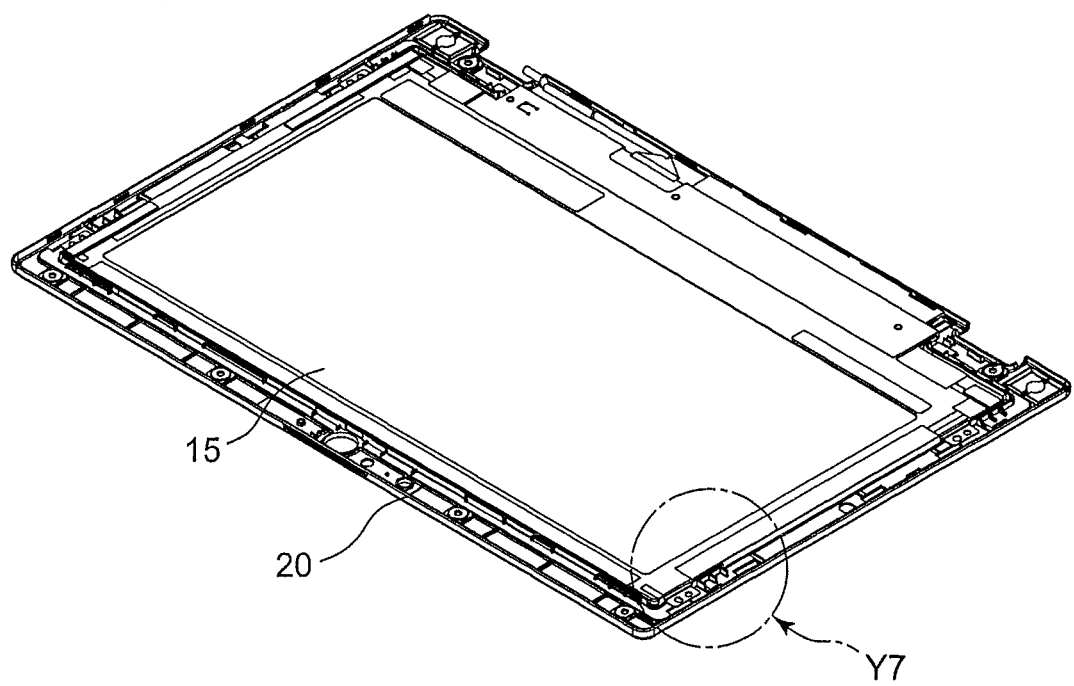
FIG. 6 is a perspective view illustrating the inside of the display unit seen from its back side and obliquely above.
Figure 7:
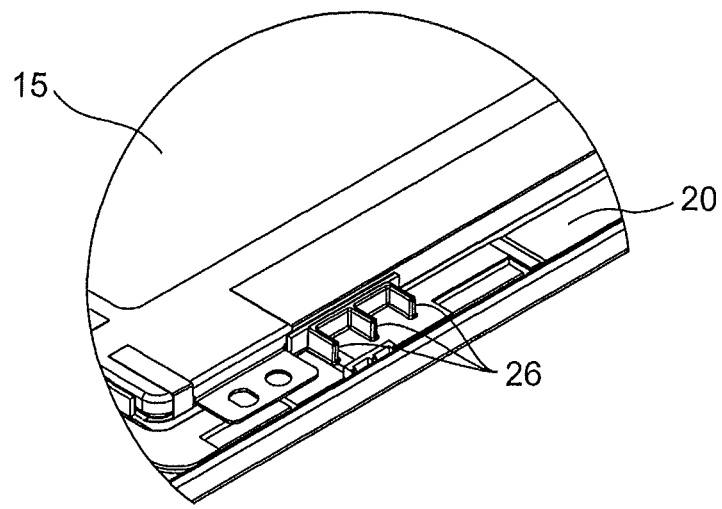
FIG. 7 is an enlarged perspective view illustrating a portion of FIG. 6 (a portion designated by a dashed-line arrow Y7)
Figure 8:
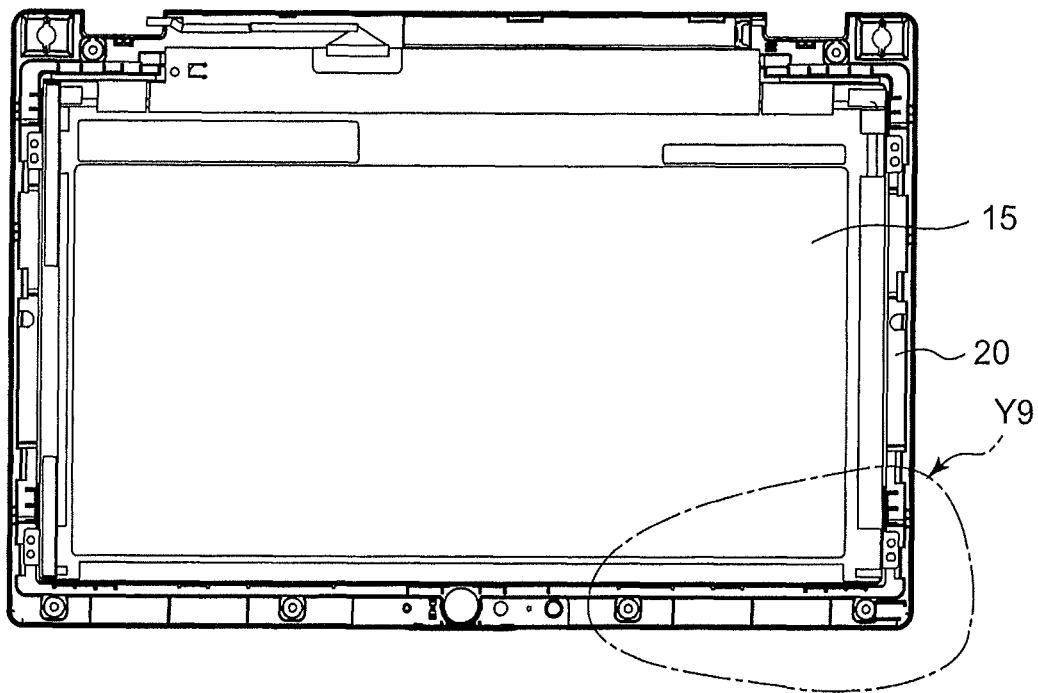
FIG. 8 is a rear view of the inside of the display unit.
Figure 9:
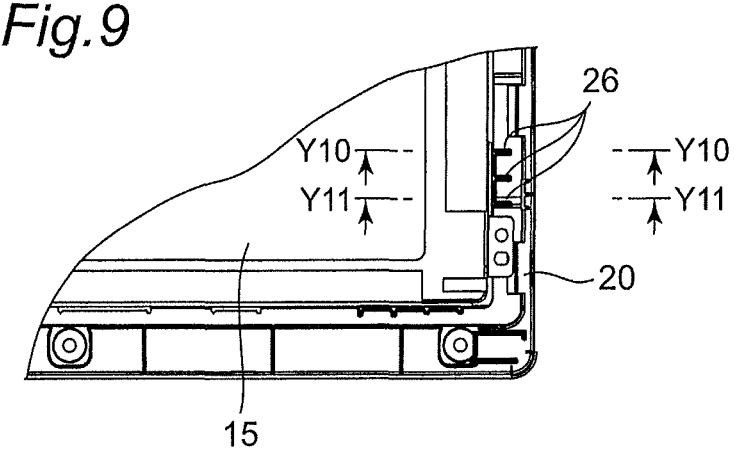
FIG. 9 is an enlarged rear view illustrating a portion of FIG. 8 (a portion designated by a dashed-line arrow Y9)

FIG. 6 is a perspective view illustrating the inside of the display unit 10, seen from its back side and obliquely above, in a state where the outer panels 12 and 13 in the first chassis 11 in FIG. 5 have been removed therefrom. FIG. 7 is an enlarged perspective view illustrating a portion of FIG. 6 (a portion designated by a dashed-line arrow Y7), in an enlarging manner. Further, FIG. 8 is a rear view illustrating the inside of the display unit 10 in a state where the outer panels 12 and 13 in the first chassis 11 in FIG. 4 have been removed therefrom. FIG. 9 is an enlarged rear view illustrating a portion of FIG. 8 (a portion designated by a dashed-line arrow Y9), in an enlarging manner. Further, FIG. 10 is a vertical cross-sectional view taken along line Y10-Y10 in FIG. 9, and FIG. 11 is a vertical cross-sectional view taken along line Y11-Y11 in FIG. 9.

Figure 10:
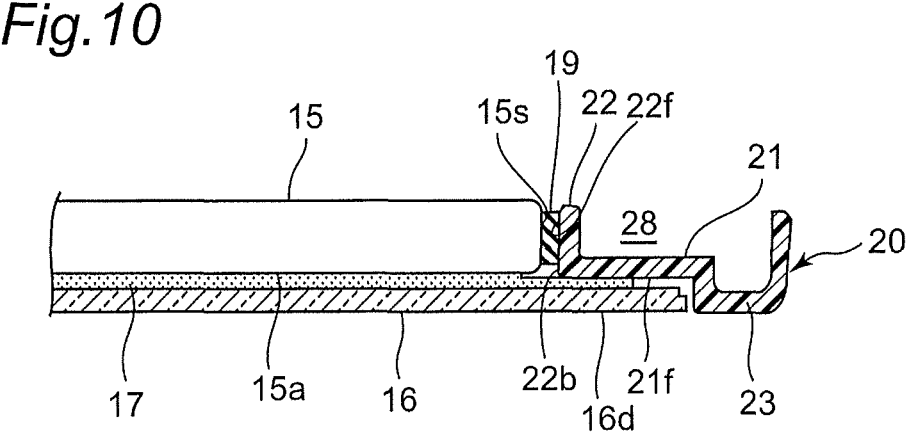
FIG. 10 is a vertical cross-sectional view taken along line Y10-Y10 in FIG. 9.
Figure 11:
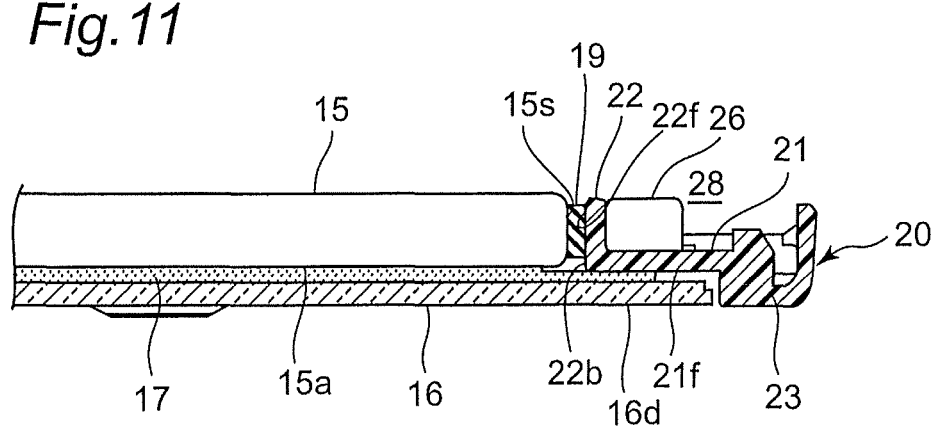
FIG. 11 is a vertical cross-sectional view taken along line Y11-Y11 in FIG. 9.

As can be well seen from FIGS. 10 and 11, the display screen 15a, which is positioned in the front surface of the plate-shaped liquid crystal panel 15, is covered, at its front surface side (the lower side in FIGS. 10 and 11), with a cover member 16 (for example, a so-called touch screen or a glass plate) having optical transparency (namely, being transparent). The cover member 16 is adhered and secured, at its back surface side (the upper side in FIGS. 10 and 11), to the front surface of the display screen 15a of the liquid crystal panel 15, through a transparent adhesive layer 17 constituted by a transparent double-sided tape or adhesive agent, for example.

The display screen 15a, the liquid crystal panel 15 and the cover member 16 correspond to "a display surface", "a display section" and "a front surface plate" which will be described in the appended claims, respectively.

In the present embodiment, the cover member 16 is formed such that it overhangs outwardly (rightwardly in FIGS. 10 and 11) by a predetermined amount from the display screen 15a of the liquid crystal panel 15. Further, corresponding thereto, the adhesive layer 17 is also formed such that it overhangs outwardly. Further, the overhanging portion 16d of the cover member 16 is adhered and secured, at its back surface, to the front surface of the base frame 20. Thus, through the cover member 16, the liquid crystal panel 15 (namely, the cover member 16 and the liquid crystal panel 15) is secured to and supported by the base frame 20.

The base frame 20 includes a first supporting portion 21 for supporting the cover member 16, and a second supporting portion 22 formed in such a way as to rise up substantially vertically from the first supporting portion 21 such that it faces a side surface 15s of the liquid crystal panel 15 at an inner end portion of the first supporting portion 21. Further, outside the first supporting portion 21, there is formed a frame outer periphery portion 23 forming an outer peripheral area of the base frame 20.

The base frame 20, the first supporting portion 21 and the second supporting portion 22 correspond to "a supporting portion", "a first supporting portion" and "a second supporting portion" which will be described in the appended claims, respectively.

The front surface of the first supporting portion 21 forms a first surface 21f which supports the cover member 16. Further, the inner side surface (the left side surface in FIGS. 10 and 11) of the second supporting portion 22 is formed in such a way as to rise up substantially vertically from the first surface 21f such that it faces the side surface 15s of the liquid crystal panel 15 and, thus, this inner side surface forms a second surface 22f including at least a rising base end portion 22b thereof. In the present disclosure, the rising base end portion 22b refers to a portion in which the thickness in the widthwise direction (the leftward and rightward direction in FIGS. 10 and 11) of the second surface 22f includes a part of the first surface 21f.

The second surface 22f is adapted to face the side surface 15s of the liquid crystal panel 15 with a predetermined interval interposed therebetween. Between the second surface 22f and the side surface 15s of the liquid crystal panel 15, there is interposed a cushioning member 19 formed from a foamed material such as a polyurethane resin or an elastic member such as a rubber. As this cushioning member 19, it is also possible to employ conventionally-known various types of members other than the aforementioned members, provided that these members can be interposed between the side surface 15s of the liquid crystal panel 15 and the second surface 22f.

As is clearly illustrated in FIGS. 10 and 11, the base frame 20 is formed such that the first supporting portion 21 and the second supporting portion 22 form a substantially L-shaped vertical cross section, and a space 28 with a predetermined size is formed in the opposite side from the first and second surfaces 21f and 22f. In the present embodiment, for example, wiring of cables and the like (not illustrated) is housed within the space 28. Instead thereof, other members and components can be also housed therein.

Further, as illustrated in FIG. 9 and FIG. 11, on the back surface of the first supporting portion 21 of the base frame 20, there are provided plural vertical ribs 26 adapted to receive the first chassis 11, when the first chassis 11 is assembled on the back surface of the base frame 20. These vertical ribs 26 are provided at plural positions on the back surface of the base frame 20.

As described above, in the present embodiment, the base frame 20 adapted to support the liquid crystal panel 15 and the cover member 16 includes the first surface 21f for supporting the cover member 16, and the second surface 22f facing the side surface 15s of the liquid crystal panel 15. Further, the second surface 22f is formed in such a way as to rise up substantially vertically from the first surface 21f and, further, includes at least the rising base end portion 22b thereof. Accordingly, when the liquid crystal panel 15 is going to move laterally, such as when an impulsive load is exerted on the display unit 10, the side surface 15s of the liquid crystal panel 15 can be received by the second surface 22f, at its rising base end portion 22b with higher rigidity or at the vicinity thereof. Forces exerted on the rising base end portion 22b are absorbed by the thickness of the first surface 21f in the widthwise direction (the leftward and rightward direction in FIGS. 10 and 11). This can suppress, more effectively, the displacement of the liquid crystal panel 15 in the lateral direction or the displacement of the base frame 20. This results in alleviation of adverse influences exerted on the internal components in the liquid crystal panel 15.

Particularly, in the present embodiment, the liquid crystal panel 15 is adhered and secured to the back surface of the cover member 16 and, furthermore, the overhanging portion 16d of the cover member 16 is adhered and secured to the front surface of the base frame 20, which enables the liquid crystal panel 15 and the cover member 16 to be secured to and supported by the base frame 20 through the single adhesive layer 17, thereby facilitating operations for adhering them to each other. Furthermore, with this structure, the front surface of the liquid crystal panel 15 and the front surface (the first surface 21f) of the first supporting portion 21 of the base frame 20 can be positioned substantially in the same plane. Thus, when the liquid crystal panel 15 is going to move laterally, the side surface 15s of the liquid crystal panel 15 can be received by the second surface 22f within a range closer to the rising base end portion 22b with higher rigidity, thereby suppressing the lateral displacement of the liquid crystal panel 15 more effectively.

Further, since the cushioning member 19 is interposed between the side surface 15s of the liquid crystal panel 15 and the second surface 22f of the second supporting portion 22 of the base frame 20, when the liquid crystal panel 15 is going to move laterally, such as when an impulsive load is exerted on the display unit 10, it is possible to effectively alleviate, through the cushioning member 19, the impulsive effect transmitted from the side surface 15s of the liquid crystal panel 15 to the second surface 22f of the second supporting portion 22.

Further, the base frame 20 is formed such that the first supporting portion 21 having the first surface 21f and the second supporting portion 22 having the second surface 22f form a substantially-L-shaped vertical cross section, and the space 28 is provided in the opposite side from the first and second surfaces 21f and 22f. Thereby, it is possible to efficiently utilize the internal space in the display unit 10. In this case, even when the second supporting portion 22 having the second surface 22f for receiving the side surface 15s of the liquid crystal panel 15 is made to have a reduced thickness, the side surface 15s of the liquid crystal panel 15 is received by the second surface 22f at the rising base end portion 22b with higher rigidity or at the vicinity thereof, which can largely alleviate the influence of the reduction of the rigidity of the second supporting portion 22 due to the thickness reduction.

Furthermore, the space 28 formed as described above can be caused to house, therein, predetermined components in the display unit 10 (for example, wires, cables or small electronic components), which enables efficient utilization of the internal space in the display unit 10.

As described above, an embodiment has been described as examples of techniques according to the present disclosure. For attaining this, the accompanying drawings and the detailed description have been given.

Accordingly, the constituents described in the accompanying drawings and the detailed description may also include constituent elements which are not necessary essential for overcoming the problems, in order to exemplify the aforementioned techniques, as well as constituent elements essential for overcoming the problems. Therefore, such non-essential constituent elements should not be immediately determined to be essential, for the reason that these non-essential constituent elements are described in the accompanying drawings and the detailed description.

Although the aforementioned embodiment has been described by exemplifying a case where the present disclosure is applied to a liquid-crystal type display device in a laptop PC, the display device according to the present disclosure is not limited to this case and can be also effectively applied to display devices for use in other various types of electronic apparatuses. Further, the display device according to the present disclosure is not limited to a liquid-crystal type display device and can be also effectively applied to any other arbitrary types of display devices including plate-type display sections with display surfaces.

As described above, the aforementioned embodiment is merely for exemplifying the techniques according to the present disclosure and, therefore, various changes, replacements, additions, omissions and the like can be made thereto within the scope of the claims and scopes equivalent thereto.

The present disclosure can be applied to display devices including plate-type display sections with display surfaces. More specifically, the present disclosure is applicable to display devices for use in electronic apparatuses and the like, for example.

What is claimed is:

1. A display device comprising: a plate-type display section comprising a display surface on a front side thereof and a side surface; a front-surface plate placed on a front surface of the display surface; and a supporting portion for supporting the display section and the front-surface plate, wherein the supporting portion includes a first surface adapted to support the front-surface plate, and a second surface extending substantially vertically from the first surface such that the second surface faces and supports the side surface of the display section potion and the display surface and the first supporting portion are bonded to the front-surface plate; Wherein a cushioning element is interposed between the side surface of the display section and the second surface of the supporting portion; wherein the front-surface plate comprises an overhanging portion that extends beyond the side surface of the plate-type display section in a lateral direction, and a back surface of the overhanging portion is bonded to the first surface of the supporting portion.

2. The display device according to claim 1, wherein the supporting portion comprises
    a first supporting portion having the first surface and
    a second supporting portion having the second surface,
    the first supporting portion and the second supporting portion form a substantially-L-shaped vertical cross section, and
    a space is formed in an opposite side from the first and second surfaces.

3. The display device according to claim 2, wherein a component is housed in the space.

4. The display device according to claim 2, wherein the supporting portion comprises a reinforcing rib formed in the space and extending from the first supporting portion and the second supporting portion.

5. The display device according to claim 1, wherein the supporting portion comprises
    a first supporting portion having the first surface, and
    a second supporting portion having the second surface,
    the first supporting portion and the second supporting portion form a substantially-L-shaped vertical cross section, and
    a space is formed in an opposite side from the first and second surfaces.

6. The display device according to claim 5, wherein a component is housed in the space.

7. The display device according to claim 5, wherein the supporting portion comprises a reinforcing rib formed in the space and extending from the first supporting portion and the second supporting portion.

8. The display device according to claim 1 further comprising upper and lower panels, the supporting portion being housed in the upper and lower panels.

9. The display device according to claim 1, wherein the supporting portion comprises a frame portion adjacent to the first surface and having a side face perpendicular to the first surface that faces an edge of the front-surface plate.

* * * * *